United States Patent [19]

Hafner et al.

[11] Patent Number: 4,502,632

[45] Date of Patent: Mar. 5, 1985

[54] ELECTROMAGNETICALLY ACTUATABLE VALVE, IN PARTICULAR A FUEL INJECTION VALVE FOR FUEL INJECTION SYSTEMS

[75] Inventors: Udo Hafner, Lorch; Waldemar Hans, Bamberg; Rudolf Krauss, Stuttgart; Rudolf Sauer, Benningen, all of Fed. Rep. of Germany

[73] Assignee: Robert Bosch GmbH, Stuttgart, Fed. Rep. of Germany

[21] Appl. No.: 558,568

[22] Filed: Dec. 6, 1983

Related U.S. Application Data

[63] Continuation of Ser. No. 320,813, Nov. 12, 1981, abandoned.

[30] Foreign Application Priority Data

Dec. 12, 1980 [DE] Fed. Rep. of Germany ....... 3046890

[51] Int. Cl.[3] .................... F02M 69/04; F02M 51/08; F16K 31/06

[52] U.S. Cl. .................................... 239/125; 239/585

[58] Field of Search .................... 239/585, 125, 397.5; 123/470, 471, 195 A

[56] References Cited

U.S. PATENT DOCUMENTS

| | | | |
|---|---|---|---|
| 3,001,757 | 9/1961 | Ball | 239/585 |
| 3,567,135 | 3/1971 | Gerbert | 239/585 |
| 4,040,569 | 8/1977 | Knapp | 239/585 X |
| 4,201,172 | 5/1980 | Jäggle et al. | 123/470 |
| 4,264,040 | 4/1981 | Saito | 239/585 |
| 4,310,123 | 1/1982 | TePastte | 239/585 |
| 4,313,571 | 2/1982 | Bellicardi et al. | 239/585 |
| 4,365,747 | 12/1962 | Krauss et al. | 239/397.5 X |

FOREIGN PATENT DOCUMENTS

| | | | |
|---|---|---|---|
| 2528683 | 1/1976 | Fed. Rep. of Germany | 239/585 |
| 2130174 | 9/1978 | Fed. Rep. of Germany | 239/125 |

*Primary Examiner*—Andres Kashnikow
*Attorney, Agent, or Firm*—Edwin E. Greigg

[57] ABSTRACT

An electromagnetically actuatable valve is proposed which serves in particular to inject fuel into the intake tube of internal combustion engine operating with fuel injection systems. The fuel injection valve includes a valve housing, a shell core having a magnetic coil and a flat armature, which is positively connected to a valve element comprising a ball which protrudes through a central opening in a guide diaphragm to cooperate with a fixed valve seat. The guide diaphragm guides the ball in the radial direction relative to the valve seat. Under spring tension, the flat armature, having a guide crown, contacts the guide diaphragm and is thus guided in a plane parallel to the end face of the shell core. A first fuel fitting comprises a portion of a valve housing pre-shaped by a non-cutting manufacturing method; a second fuel fitting is fixed inside the first fuel fitting in such a manner that a flow conduit is defined between the first and the second fuel fittings. The fuel flowing in via the second fuel fitting proceeds to the valve seat; when the valve is open, a portion of the fuel is delivered there to a nozzle bore in order to be metered. The non-metered fuel flows around the magnetic element and proceeds via the flow conduit into a fuel return flow line.

7 Claims, 4 Drawing Figures

ELECTROMAGNETICALLY ACTUATABLE VALVE, IN PARTICULAR A FUEL INJECTION VALVE FOR FUEL INJECTION SYSTEMS

This is a continuation of copending application Ser. No. 320,813 filed Nov. 12, 1981, now abandoned.

BACKGROUND OF THE INVENTION

The invention is based on an electromagnetically actuatable valve having two fuel fittings, one disposed within the other, so as to create a fuel flow conduit therebetween. An electromagnetically actuatable valve has already been proposed in which the valve housing and the fuel fitting are made up of several individual parts; it is expensive not only to manufacture such a valve, but also to mount it in the engine. Furthermore, the proposed embodiment of the magnetic element for generating the desired magnetic forces requires a relatively large space for its accommodation, which tends to preclude a desired reduction in valve size.

OBJECT AND SUMMARY OF THE INVENTION

It is an object of the invention to provide a valve having the advantage over the prior art that the valve housing and the connection fitting are manufactured in simple fashion, by means of deep drawing, rolling or the like.

It is a further object of the invention that the mounting of the valve is simplified.

It is another object of the invention to provide a magnetic element of small size.

It is still another object of the invention to provide friction-free and plane-parallel guidance of the flat armature.

It is a still further object of the invention to prepare the fuel quantity metered by the valve via preparation air or swirl injection.

The invention will be better understood and further objects and advantages thereof will become more apparent from the ensuing detailed description of two preferred embodiments taken in conjunction with the drawings.

DESCRIPTION OF THE EXEMPLARY EMBODIMENTS

Figure 1:
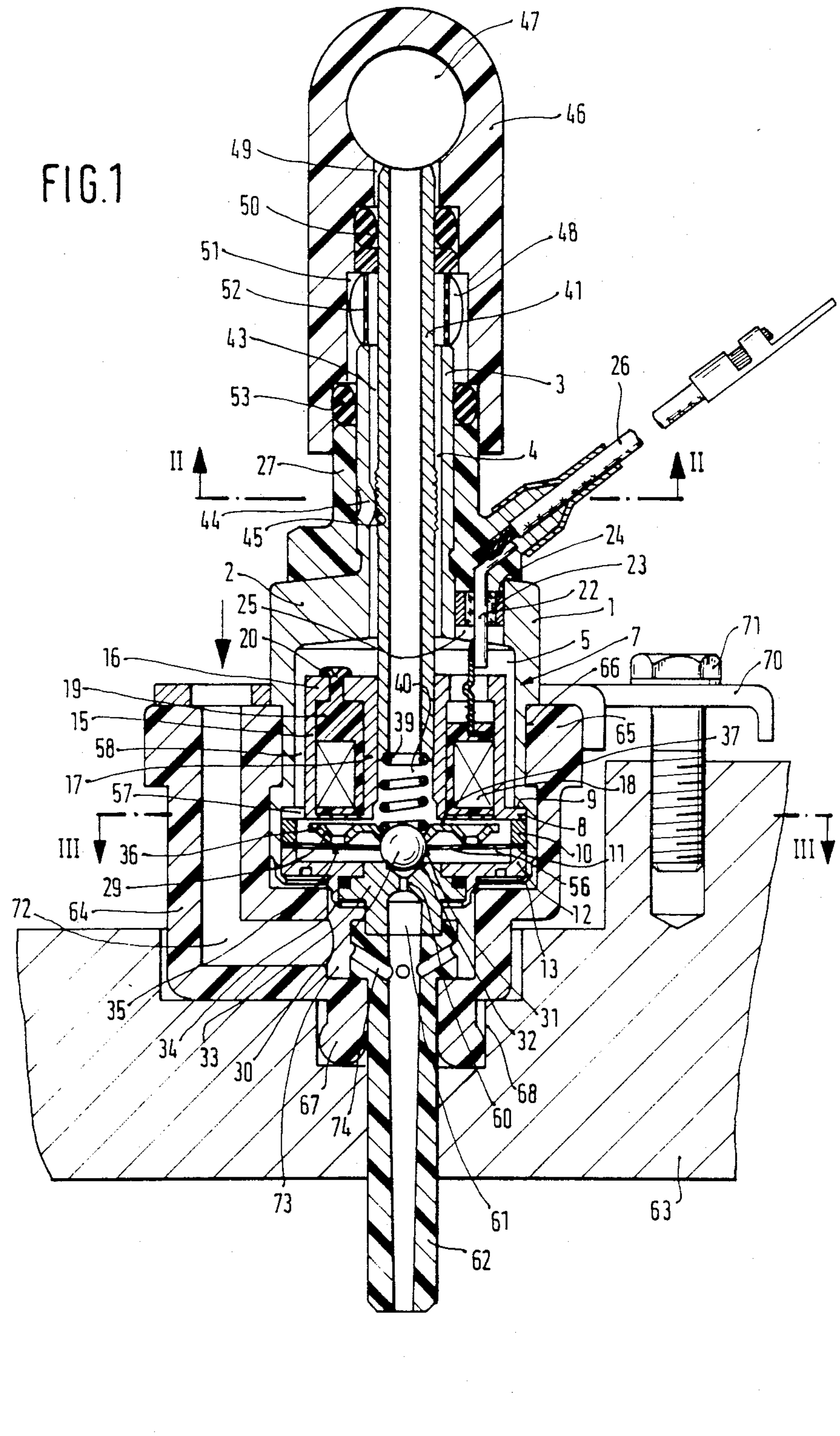
FIG. 1 shows an electromagnetically actuatable fuel injection valve with air enveloping for fuel preparation.
Figure 2:
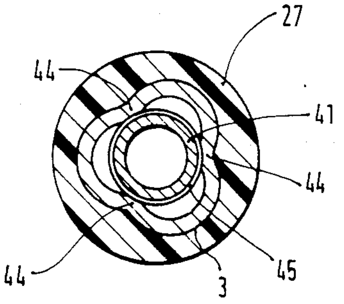
FIG. 2 is a section taken along the line II—II of FIG. 1.
Figure 3:
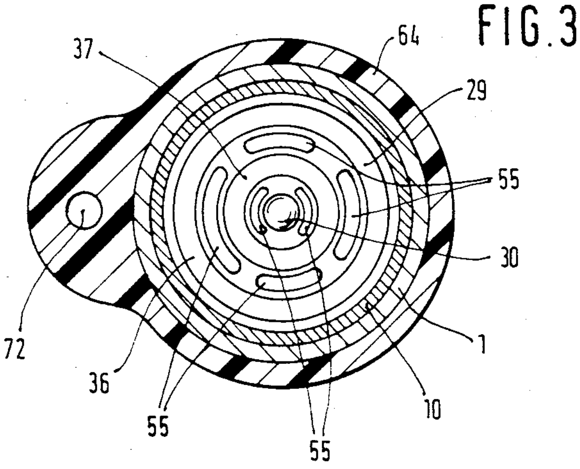
FIG. 3 is a section taken along the line III—III of FIG. 1.

The fuel injection valve shown in FIGS. 1-4, intended for a fuel injection system, serves by way of example to inject fuel, in particular at low pressure, into the intake tube of mixture-compressing internal combustion engines with externally supplied ignition. A valve housing 1 is fabricated by a non-cutting shaping method, such as deep drawing, rolling and the like; it has an inverted cup-shaped form with a bottom 2 that extends transversely of the longitudinal axis of the valve, from which a tubular fuel fitting 3 extends axially of said cup bottom exteriorly thereof. The fuel fitting 3 has an inner bore 4, which likewise passes through the cup bottom 2 and discharges into the interior of the valve housing 1. A shell core 7 is inserted into the interior 5 of the valve housing 1. The shell core 7 has a smaller diameter than does the interior 5 and rests with a shoulder 8 on an inner step 9 of the valve housing 1. A spacer ring 10 engages the side of the shoulder 8 remote from the inner step 9. The spacer ring 10 is followed in sequence by a guide diaphragm 11 and then a nozzle carrier 12, provided with a crimped edge 13 engaging the end face of the nozzle carrier 12 by partially surrounding it and exerting an axial stress on the nozzle carrier. This axial stress assures the positional fixation of the shell core 7, the spacer ring 10, the guide diaphragm 11 and the nozzle carrier 12. A conventional shell-type core of type T 26 made by Siemens may be used as the shell core 7; this has an annular outer core 15 and an annular inner core 17 connected to the outer core via a crosspiece 16. A magnetic coil 18 is surrounded at least partially by an insulating carrier body 19, which is inserted together with the magnetic coil 18 into the annular chamber of the shell core 7 formed between the outer core 15 and the inner core 17 and is connected in a positively engaged manner with the crosspiece 16, for instance by means of rivets 20 or by a releasable snap-lock connection. The supply of electric current to the magnetic coil 18 is advantageously effected via contact pins 22, only one of which is shown, which are embedded in an insulating insert 23 of glass, for example. The insulating insert 23 may be surrounded by a fastening ring 24 which is sealingly inserted into an open bore 25 of the valve housing bottom 2 and fixed in place by soldering, for example. Either plug connections, in a manner which is known but not illustrated here, or electric cables 26 as shown may be connected with the contact pins 22. The first fuel fitting 3, contact pins 22 and cables 26 may be partially embedded in a plastic ring element 27 which is seated on the valve housing bottom 2.

A flat armature 29 is disposed between the end face of the shell core 7 which is remote from the crosspiece 16 and the guide diaphragm 11. In the middle portion of the flat armature 19, a movable valve element in the form of a ball 30 is connected with the flat armature, by welding or soldering, for instance. The ball 30 passes through a central opening 31 in the guide diaphragm 11 and cooperates with a fixed valve seat 32 embodied in a nozzle body 33. The nozzle body 33 is inserted into the nozzle carrier 12 and is held therein by means of a crimped area 34, for instance. The ball 30 acting as the valve element and the flat armature 29 extend through the central opening 31 of the guide diaphragm 11 in the radial direction both to the valve seat 32 and to the end face of the shell core 7. A rigid connection of the guide diaphragm 11 is not provided, either with the ball 30 or with the flat armature 29. The flat armature 29 may be embodied as a stamped or pressed part and may have, by way of example, an annular guide crown 35 oriented toward the guide diaphragm 11. This guide crown 35, first, improves the rigidity of the flat armature 29; secondly, it separates a first work area 36 of the flat armature, which is oriented toward the end face of the outer core 15, from a second work area 37, which is oriented toward the end face of the inner core 17; and thirdly, it forms a guide edge which rests on the guide diaphragm 11, as a result of which the flat armature 29 is guided in a parallel plane to the end face of the shell core 7. The ball 30 acting as the valve element is urged in the closing direction of the valve by a compression spring 39, which on the other end protrudes into an inner bore 40 of the shell core 7 and is supported on a tubular second fuel fitting 41. The force of the compression spring 39 upon the flat armature 29 and the ball 30 may be influenced by means of axially displacing the second fuel fitting 41.

The tubular second fuel fitting 41 serves as a fuel inlet fitting and is provided with a smaller diameter than the inner bore 4, such that a flow conduit 43 is formed between the second fuel fitting 41 and the wall of the inner bore 4. The first fuel fitting 3 is provided with indentations 44 (see FIG. 2 as well), formed by crimping, which are offset by approximately 120° relative to one another and fix the second fuel fitting 41, which has already been introduced through the bottom 2 of the housing into the inner bore 40 of the shell core 7, in its position after the spring force of the compression spring 39 has been adjusted. It may be efficacious to provide the outer circumference of the second fuel fitting with notches 45, having the form of flat annular grooves, threads, knurls or the like, which are engaged by the indentations 44 of the first fuel fitting 3 in order to assure better axial fixation of the second fuel fitting 41. The connection of the fuel injection valve to the fuel supply is effected via a plug nipple 46, which engages a fuel distributor line 47 and a fuel return flow line 48 disposed below the fuel distributor line 47. The plug nipple 46 is pushed partway onto the fuel ring element 27, the first fuel fitting 3 and the second fuel fitting 41, respectively, the second fuel fitting 41 protruding out of the first fuel fitting 3. The second fuel fitting 41 protrudes into a bore 49 of the plug nipple 46, which communicates with the fuel distributor line 47 and is sealed off on the other end by a sealing ring 50 from a bore 51 of the plug nipple 46 which communicates with the fuel return flow line 48. The end of the first fuel fitting 3 protrudes into the bore 51 of the plug nipple 46 so that the flow conduit 43 discharges into the bore 51. A cylindrical fuel filter 52 is disposed in the bore 51 of the plug nipple 46, engaging the second fuel fitting 41 passing therethrough, in such a manner that the fuel flowing out by way of the flow conduit 43 is capable of reaching the fuel return flow line 48 only by way of the fuel filter 52. The fuel filter 52 is supported at one end on the end face of the first fuel fitting 3 and on its other end acts as a means of axially fixing the sealing ring 50. A further sealing ring 53 is seated on the end face of the plastic ring element 27 and seals the first fuel fitting 3 off from the atmosphere, surroundingly engaging the bore 51 of the plug nipple 46. The fuel flows from the fuel distributor line 47 via the second fuel fitting 41 to the flat armature 29; from there, it flows to the valve seat 32, either through the flat armature via openings 55 (see FIG. 4) or around the flat armature via openings 56 in the guide membrane 11. In order to cool the magnetic element 7, 18, a portion of the fuel thus delivered also flows, when the valve seat is open, toward the bottom 2 of the valve housing 1, via openings 57 in the shoulder 8 of the shell core 7 via the annular gap 58 formed between the inner wall of the valve housing 1 and the outer circumference of the shell core 7, and from there flows back into the fuel return flow line 48 via the flow conduit 43. When the fuel injection valve is open, the fuel flows via the valve seat 32 to a metering nozzle bore 60 provided in the nozzle body 33. Adjoining the nozzle bore 60 is a guide conduit 61, whose diameter is larger than the nozzle bore 60. The guide conduit 61 may also comprise partially a portion of the nozzle body 33 and partially a mixture guidance tube 62, which penetrates the intake tube wall 63 of the engine. As shown, the mixture guidance tube 62 may be mounted on the nozzle body 33 and guided concentrically to the valve axis by an elastic holder sheath 64, which surrounds the valve housing 1 in the axial direction so as to partially seal it and which snaps into an outer groove 66 with an annular locking shoulder 65. The holder sheath 64 may comprise an annular sealing shoulder 67, which when the fuel injection valve is inserted into a reception bore 68 of the intake tube wall 63 effects the seal between the interior of the intake tube and the atmosphere. The positional fixation of the fuel injection valve may be effected by the engagement of a tensioning claw 70 with the locking shoulder 65 of the holder sheath 64, being fastened to the intake tube wall 63 at the other side with at least one screw 71.

Particularly at low fuel pressures, it is efficacious to add air for preparation purposes to the fuel to be injected, doing so even before the fuel is injected into the intake tube. The source of preparation air may, for example, be an air pump or air from the atmosphere, which is preferably diverted away from the intake tube section located between the air filter and the throttle valve of the engine. This preparation air is efficaciously delivered via a preparation air line 72, comprised partially within the holder sheath 64, to an annular chamber 73 provided within the holder sheath 64 and annularly surrounding the mixture guidance tube 62. Air conduits 74 are provided in the mixture guidance tube 62 in the vicinity of the annular chamber 73, communicating on one end with the annular chamber 73 and on the other end discharging into the guide conduit 61, so that preparation air can be delivered from the annular chamber 73 via the air conduits 74 to the fuel intended for injection. The mixture guidance tube 62 may also be provided directly within the holder sheath 64, and the preparation air may be delivered to the fuel via an air gap 69 between the end face of the nozzle body 33 and the end face of the opposite mixture guidance tube 62 (see FIG. 4).

Figure 4:
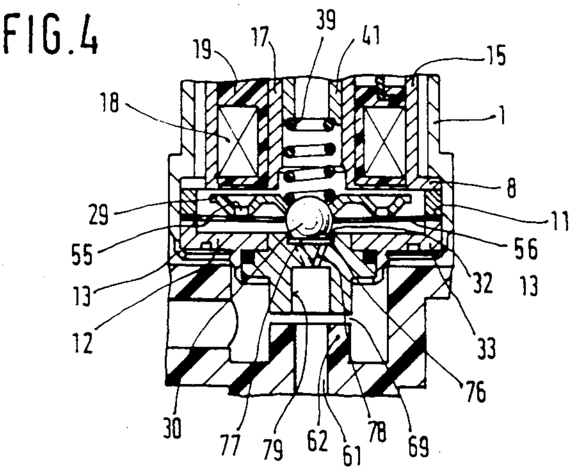
FIG. 4 shows a fuel injection valve, in a partially cutaway view, which has spin preparation.

In the exemplary embodiment of a fuel injection valve shown in FIG. 4, the elements which remain the same and have the same function as those of the previous embodiment are identified by the same reference numerals. Since only the area of the fuel injection valve located downstream of the valve seat 32 is varied in this embodiment, FIG. 4 shows only a partial detail of the fuel injection valve.

In order to attain the smallest possible clearance space downstream of the valve seat 32, the ball 30 acting as the valve element is provided with a flattened area 76 downstream of the area on the circumference which acts as a seal and cooperates with the valve seat 32. Adjacent to the valve seat 32 within the nozzle body 33 is a collector chamber 77, the volume of which is kept as small as possible; swirl conduits 78 branch off from the collector chamber 77, being inclined at an angle relative to the valve axis and discharging at a tangent, for example, into a swirl chamber 79. The metering of the fuel is effected at the swirl conduits 78. The fuel film which forms on the wall of the swirl chamber 79 tears off at the sharply defined end of the swirl chamber 79, which discharges into the intake tube, so that the fuel enters the air flow of the intake tube in a conical pattern.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An electromagnetically actuatable valve, in particular a fuel injection valve for fuel injection systems of internal combustion engines, said valve having an axis and encompassed by a housing including a wall, a magnetic coil mounted on a core having a predetermined length and constructed of ferromagnetic material, an armature firmly connected with a valve element arranged to cooperate with a fixed valve seat and guided by means of a guide diaphragm clamped to said housing at its outer circumference, a first tubular fuel fitting concentrically disposed relative to said valve axis and a second tubular fuel fitting coaxially disposed inside said first fuel fitting whereby a flow conduit for the fuel is formed between said first and said second fuel fitting, said valve housing being an inverted cup forming a chamber the bottom of which extends transversely of said axis, said second fuel fitting having a portion spaced from said valve element, a compression spring interposed between said portion and said valve element biasing the latter into engagement with said valve seat, the biasing force of said spring being adjustable by axial displacement of said second fuel fitting, said first fuel fitting extending axially of said cup bottom exteriorly thereof, said flow conduit having an end remote from said valve seat which communicates with a first fuel line and said second fuel fitting communicating with a second fuel line, said second fuel fitting protruding through said cup bottom into said core and said flow conduit terminating at said cup bottom of said valve housing and communicating with said chamber of said valve housing, which chamber surrounds said magnetic coil and with it forms an annular gap, by means of which a flow connection for the fuel between the flow conduit and the second fuel fitting is provided.

2. A valve as defined by claim 1, in which said second fuel fitting comprises a fuel supply fitting for transporting fuel to said engine, and excess fuel is returned to supply by flowing between said first and second fuel fittings.

3. A valve as defined by claim 2 in which said fuel flowing in via said second fuel fitting passes over said armature and said guide diaphragm to said valve seat, and returning fuel flows around said magnetic element.

4. A valve as defined by claim 1, in which said valve seat communicates with a nozzle bore within a nozzle body, said nozzle bore being positioned downstream of the valve seat, a guide conduit of a larger diameter conjoining said nozzle bore and comprising in part a mixture guidance tube having means for introducing preparation air into the fuel flowing through said guide conduit, said mixture guidance tube being held concentrically relative to the valve axis by a holder sheath.

5. A valve as defined by claim 4, in which said holder sheath comprises elastic material and the valve housing partially surrounding said holder sheath is positively connected therewith.

6. A valve as defined by claim 5, in which said means for introducing preparation air into said guide conduit extends partially within the holder sheath up to its point of discharge into said guide conduit.

7. A valve as defined in claim 6, in which said holder sheath has a portion remote from said valve housing which is embodied as an annular sealing shoulder.

* * * * *